(12) United States Patent  
Bohnker et al.

(10) Patent No.: US 6,484,870 B2
(45) Date of Patent: Nov. 26, 2002

(54) DUAL BELT CONVEYOR SYSTEM

(76) Inventors: John N. Bohnker, 102 Hanna Cir., Underwood, IA (US) 51576; David Hoffman, 1331 Oriole Ave., Audubon, IA (US) 50025

(*) Notice: Subject to any disclaimer, the term of this patent is extended or adjusted under 35 U.S.C. 154(b) by 0 days.

(21) Appl. No.: 09/878,679

(22) Filed: Jun. 11, 2001

(65) Prior Publication Data

US 2001/0052450 A1 Dec. 20, 2001

Related U.S. Application Data

(60) Provisional application No. 60/211,416, filed on Jun. 14, 2000.

(51) Int. Cl.[7] ............................ B65G 15/12; B65G 15/14
(52) U.S. Cl. ........................ 198/626.2; 198/626.5; 198/606; 198/620
(58) Field of Search .................... 198/626.1, 626.2, 198/626.5, 620, 606, 607

(56) References Cited

U.S. PATENT DOCUMENTS

| | | | |
|---|---|---|---|
| 2,836,285 A | * 5/1958 | Muller | 198/626.2 |
| 3,734,270 A | * 5/1973 | Foody | 198/626.2 |
| 3,910,405 A | 10/1975 | Couperus et al. | |
| 3,982,626 A | * 9/1976 | Mehta | 198/626.2 |
| 4,195,724 A | 4/1980 | Janitsch | |
| 4,355,741 A | * 10/1982 | Kayss | 141/313 |
| 4,425,995 A | * 1/1984 | Blattermann et al. | 198/605 |
| 4,585,118 A | 4/1986 | Plaut | |
| 4,732,264 A | * 3/1988 | Engst | 198/605 |
| 4,776,450 A | * 10/1988 | Schwing et al. | 198/626.2 |
| 4,936,441 A | * 6/1990 | Akesaka | 198/626.2 |

* cited by examiner

*Primary Examiner*—Christopher P. Ellis
*Assistant Examiner*—Richard Ridley

(57) ABSTRACT

A dual belt conveyor includes a pair of flexible endless loop conveyor belts arranged at an incline with a lower flight of the upper belt in face-to-face conveying relationship with an upper flight of the lower belt to retain and convey granular material between the belts. Drive pulleys are connected to both belts to move the belts at the same speed, and the conveying flights of the belts are journaled through a trough which forces the belts into a curved concave orientation between the side edges with the upper belt biased downwardly into engagement with product on the lower belt to retain product therebetween.

14 Claims, 4 Drawing Sheets

DUAL BELT CONVEYOR SYSTEM

CROSS-REFERENCES TO RELATED APPLICATIONS

This application claims the benefit of U.S. Provisional Application Serial No. 60/211,416, filed Jun. 14, 2000.

BACKGROUND OF THE INVENTION

(1) Field of the Invention

The present invention relates generally to sandwich belt endless conveyor systems, and more particularly to an improved sandwich belt conveyor system which will carry large volume of product up very steep slopes without loss of product or damage to the product.

(2) Background Information

Belt conveyors have been utilized for many years to transport bulk materials, including granular materials, between various levels. However, single belt conveyors are restricted to a very shallow angle, because of the back flow of material being conveyed.

To overcome this problem, a pair of dual endless flexible conveyor belts are engaged in face to face relationship to trap the bulk material therebetween and convey the bulk material at very steep vertical angles. These dual belt systems, commonly referred to as sandwich belt systems, have taken on various forms to convey bulk materials. For example, U.S. Pat. No. 3,910,405 to Couperus et al., discloses a first belt with raised edges which engage and seal with the edges of a second belt. A plurality of protruding cleats on the belt assist in carrying bulk granular material along a steep slope.

U.S. Pat. No. 4,195,724 to Janitsch discloses a sandwich belt conveyor utilizing staggered rollers to urge the edges of the belts into engagement with one another to reduce leakage or spillage of material. The edges of the belts are stretched in following a sinuous path between the edge rollers, causing the confronting belt edges to firmly engage one another.

U.S. Pat. No. 4,585,118 to Plaut discloses a sandwich belt system with special rollers designed to provide automatic tracking and centering of the belts of a dual belt conveyor system.

While such sandwich belt systems have been effectively utilized to transport sludge, sewage, slurry-type materials and solid or semi-solid bulk material, they still have a number of problems when used for transporting granular materials such as seed and the like. The main problem of prior art sandwich belt systems is in the squeezing pressure between the belts in order to carry the granular material up steep inclines. If the belts are squeezed together too tightly, the seed can be damaged. On the other hand, if the belts are not squeezed tightly enough together, the seed can escape from between the belts.

BRIEF SUMMARY OF THE INVENTION

It is therefore a general object of the present invention to provide an improved sandwich belt conveyor system.

Another object of the present invention is to provide a sandwich belt conveyor system which will carry large volumes of granular product up very steep inclines, without damage to the granular product.

A further object is to provide a sandwich belt conveyor system which will carry large volumes of granular product up steep inclines without loss of product.

These and other objects of the present invention will be apparent to those skilled in the art.

The dual belt conveyor of the present invention includes a pair of flexible endless loop conveyor belts arranged at an incline with a lower flight of the upper belt in face-to-face conveying relationship with an upper flight of the lower belt to retain and convey granular material between the belts. Drive pulleys are connected to both belts to move the belts at the same speed, and the conveying flights of the belts are journaled through a trough which forces the belts into a curved concave orientation between the side edges with the upper belt biased downwardly into engagement with product on the lower belt to retain product therebetween.

BRIEF DESCRIPTION OF THE SEVERAL VIEWS OF THE DRAWING

The preferred embodiments of the invention are illustrated in the accompanying drawings, in which similar or corresponding parts are identified with the same reference numeral throughout the several views, and in which.

DETAILED DESCRIPTION OF THE INVENTION

Figure 1:
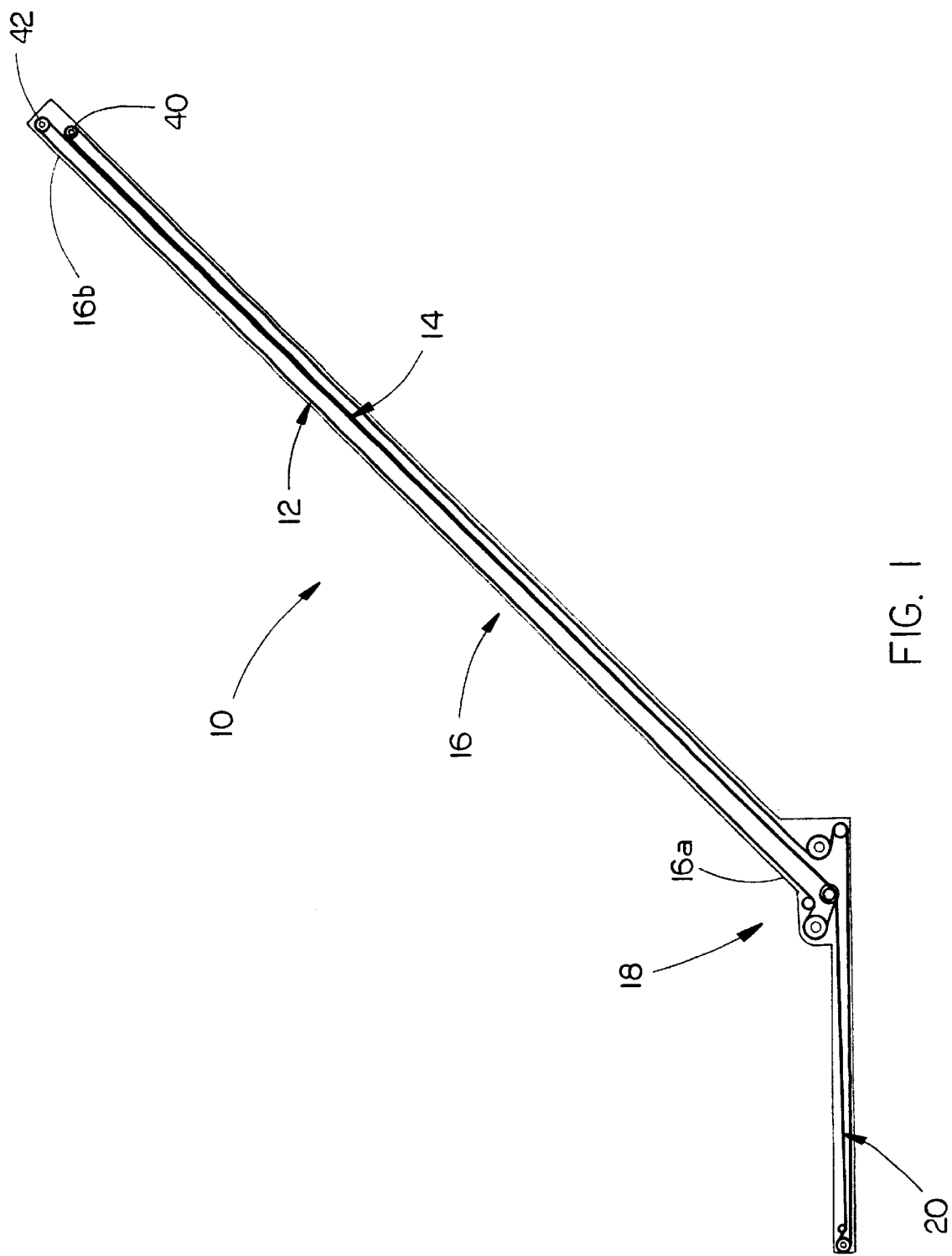
FIG. 1 is a side schematic view of the conveyor system of the present invention.

Referring now to the drawings, and more particularly to FIG. 1, the squeeze belt conveyor system of the present invention is designated generally at 10 and includes a pair of upper and lower endless loop belts 12 and 14 extending through a conveyor hopper 16 to carry product from an input end 16a to a discharge end 16b. Conveyor hopper 16 is oriented at a steep incline relative to a horizontal, at an angle much greater than possible with a single belt conveyor system.

An elbow 18 connects the lower input end 16a of conveyor hopper 16 to a generally horizontally oriented infeed hopper 20. Product to be conveyed by conveyor system 10 is input in infeed hopper 20 and conveyed to elbow 18 and thence through conveyor hopper discharge end 16b, as described in more detail described in more detail hereinbelow.

Figure 2:
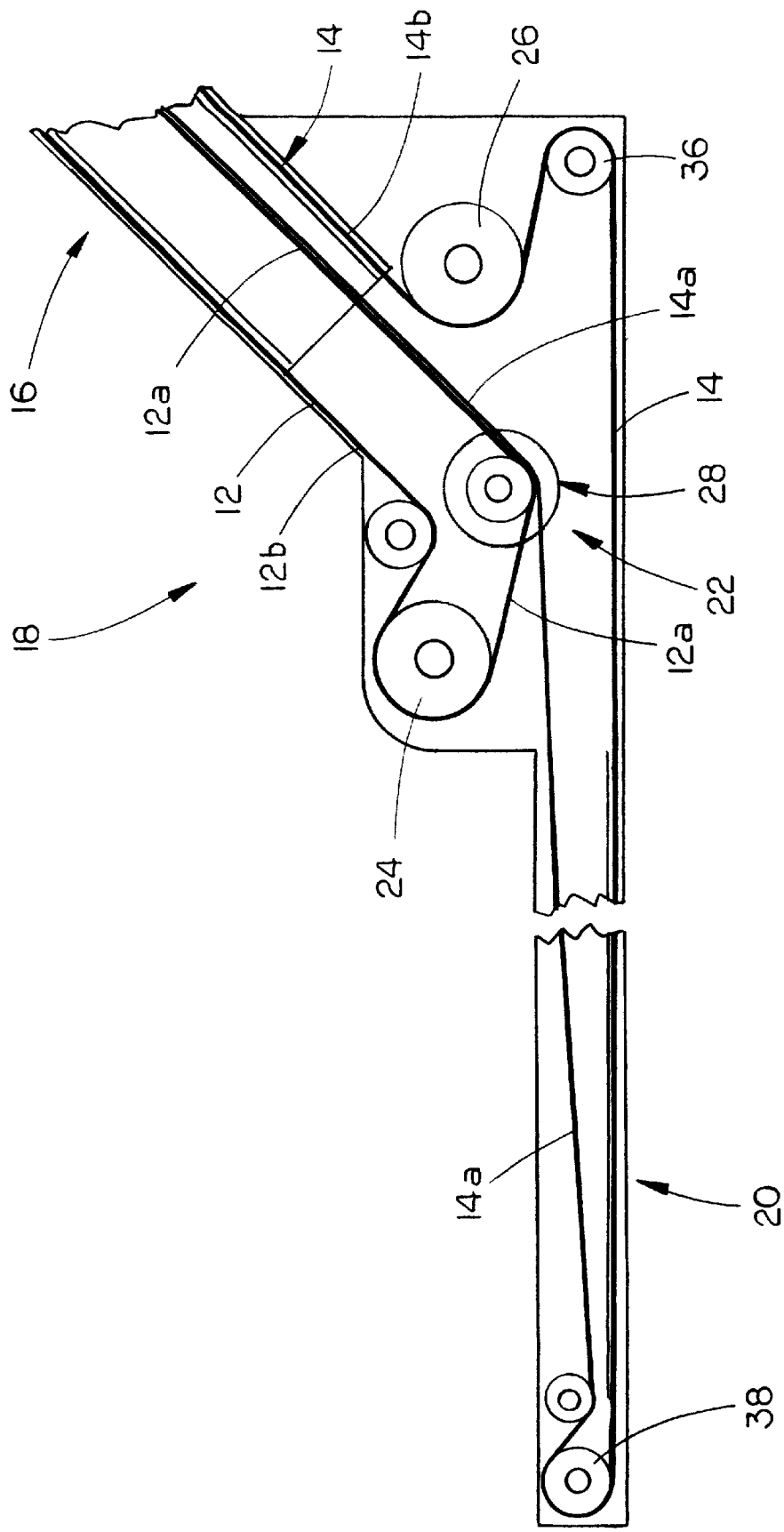
FIG. 2 is an enlarged schematic view of the elbow of the schematic of FIG. 1 showing the orientations and arrangements of the belts and drive mechanism.

Referring now to FIG. 2, a drive assembly 22 is operably mounted within elbow 18, to drive upper and lower belts 12 and 14 respectively. Drive assembly 22 includes a pair of drive rollers 24 and 26 extending parallel to one another between a pair of side walls of elbow 18. One end of upper belt 12 is looped around drive roller 24, while a portion of lower belt 14 engages drive roller 26, to thereby drive upper and lower belts 12 and 14 respectively. Preferably, drive rollers 24 and 26 are connected (not shown) so as to rotate at the same rate, to thereby drive upper and lower belts 12 and 14 at the same speed.

A special acorn pulley 28 is disposed adjacent the lower end of conveyor hopper 16, and is located parallel to and between drive rollers 24 and 26. A lower conveying flight 12a of upper belt 12 extends from drive roller 24 and thence under acorn pulley 28 before proceeding upwardly through conveyor hopper 16. An upper conveying flight 14a of lower belt 14 extends from infeed hopper 20, thence into engagement with acorn pulley 28, and thence upwardly through conveyor hopper 16. In this way, the two conveying flights 12a and 14a of upper and lower belts 12 and 14 pass around acorn pulley 28 immediately prior to movement through conveyor hopper 16.

Figure 3A:
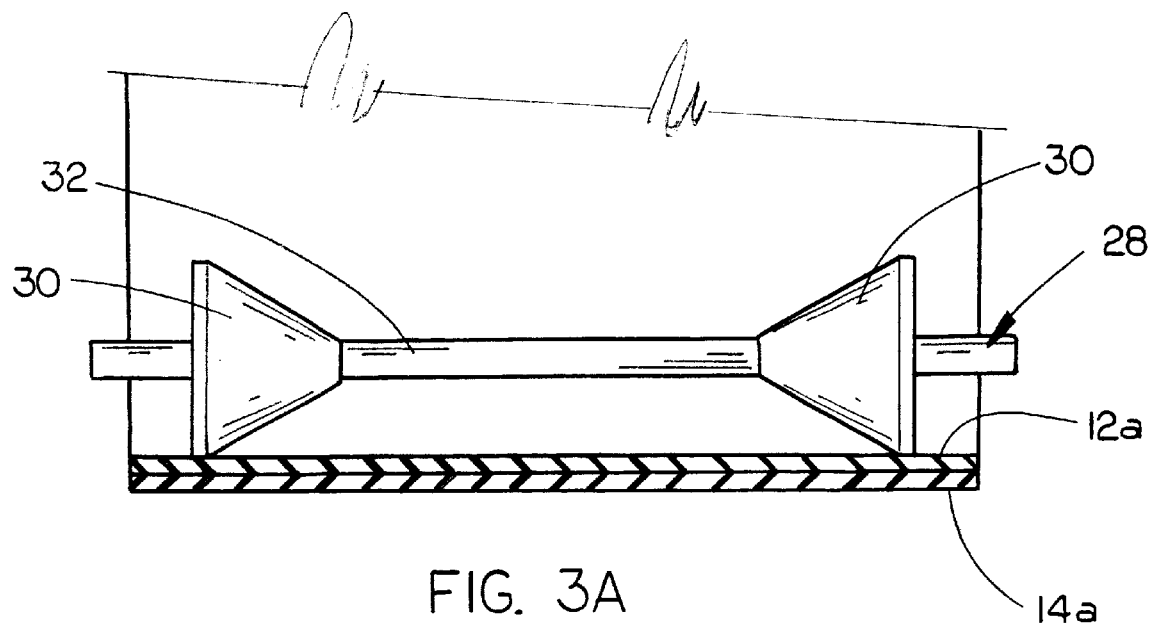
FIG. 3A is an elevational view of the acorn pulley of the systems, taken at lines 3—3 in FIG. 2.
Figure 3B:
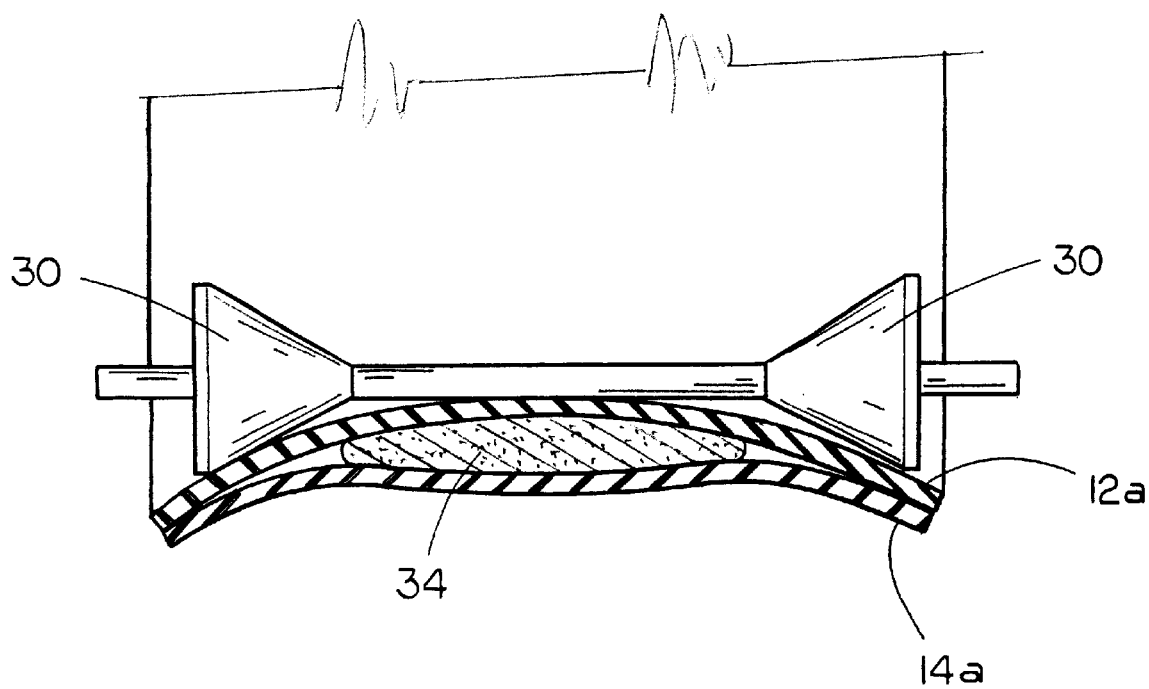
FIG. 3B is a view similar to 3A, but with granular product engaged between the belts.

As shown in FIGS. 3a and 3b, an end view of acorn pulley 28 is shown, with upper belt lower flight 12a engaging lower belt upper flight 14a as they pass around acorn pulley 28. Acorn pulley 28 includes a pair of cone-shaped acorns 30 at each end of pulley shaft 32, the acorns having their largest diameters at the outward ends of shaft 32 and tapering inwardly therefrom. As shown in FIG. 3a, belt flights 12a and 14a contact one another in a generally flat flush condition as they travel around acorn pulley 28 with the belts riding on the largest diameter of acorns 30. As granular product 34 is added on top of lower belt upper flight 14a, the central portions of belt flights 12a and 14a will separate from one another as product 34 is gently squeezed between the belts. As shown in FIG. 3b the edges of the belts will curve to conform to the sloped surfaces of acorns 30 as product 34 grows in volume between the belts.

Referring once again to FIG. 2, it can be seen that lower belt 14 is looped around a pair of free rolling tail pulleys 36 and 38 located at forward and rearward ends of infeed hopper 20. More specifically, the lower return flight 14b of lower belt 14 exits the input end 16a of conveyor hopper 16, travels around the lower belt drive roller 26, thence around tail pulley 36, and then extends the length of infeed hopper 20 and is looped around tail pulley 38 before extending to acorn pulley 28 as the upper flight 14a of lower belt 14. Granular product is deposited on the lower belt upper flight 14a in infeed hopper 20, which carries the product to acorn pulley 28 at the input end of conveyor hopper 16. As discussed above, upper belt lower flight then engages the upper surface of lower belt upper flight 14a to squeeze the product between the belts, as the belts pass around acorn pulley 28. As shown in FIG. 1, the sandwiched flights of belts 12 and 14 extend upwardly through conveyor hopper 16 to discharge end 16b. At discharge end 16b, lower belt upper flight 14a traverses downwardly around tail pulley 40, thereby separating the lower belt upper flight from the upper belt lower flight and discharging product from between the sandwiched flights. Upper belt lower flight 12a continues upward to tail pulley 42, where it traverses upwardly around the tail pulley. Upper belt upper flight 12b and lower belt lower flight 14b then return downwardly through conveyor hopper 16 on the return run of each belt.

Figure 4:
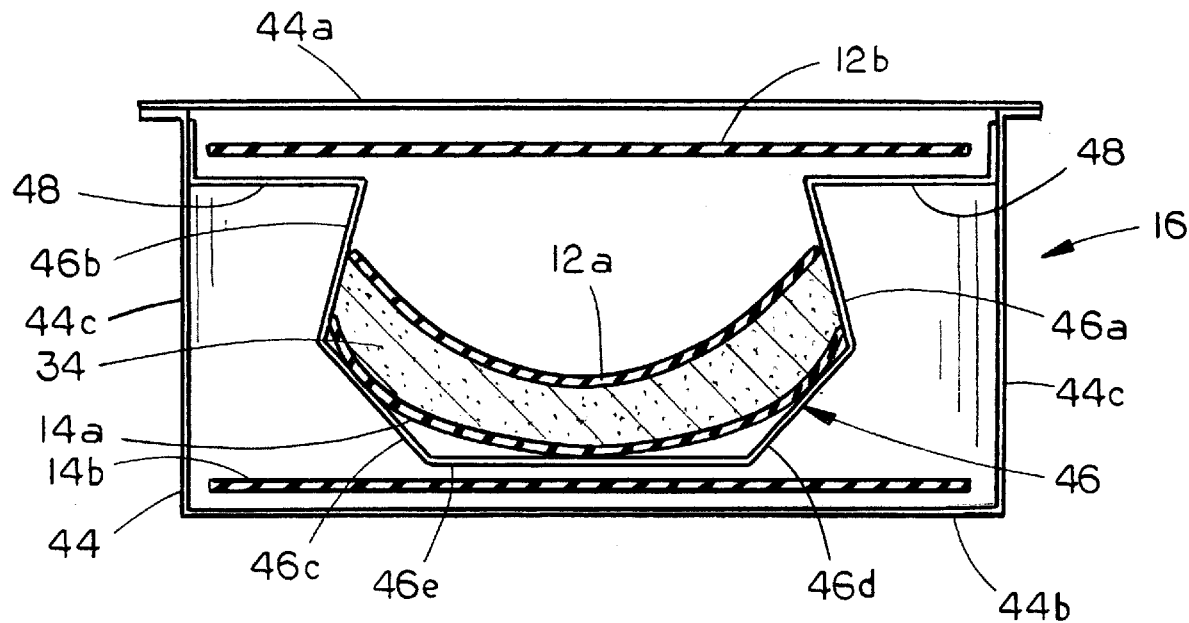
FIG. 4 is an enlarged sectional view taken at lines 4—4 in FIG. 1.

Referring now to FIG. 4, hopper 16 is preferably an elongated rectangular tube 44 having top and bottom walls 44a and 44b, and opposing side walls 44c. A trough 46 is formed within tube 44 through which flights 12a and 14a of upper and lower belts 12 and 14 will slide as they convey product 34 therebetween. The inventors herein have found that the use of a generally U-shaped trough 46 having upper leg portions 46a and 46b with upper ends sloped towards one another will cause upper belt lower flight 12a to be forced into a curved orientation pressing downwardly against product 34 and lower belt upper flight 14a. As can be seen in FIG. 4, the width of trough 46 between upper legs 46a and 46b is less than the width of belts 12 and 14 (which may be seen in their respective return flights 12b and 14b above and below trough 46). As additional product is added between the belts, the upper belt lower flight is raised thereby further increasing the curvature and pressure of the upper belt against the product. Lower portions 46c and 46d of the legs of trough 46 have lower ends which slope inwardly and are connected to horizontal base 46e of trough 46. It can be seen that the slope of the lower end of leg lower portions 46c and 46d also supports the curvature of lower belt upper flight 14a as it slides along trough 46.

The upper ends of trough leg upper portions 46a and 46b are connected to the tube side walls 44c and 44d respectively, by coplanar shelves 48. Shelves 48 will retain the return flight 12b of upper belt 12 on its return from the discharge end of conveyor hopper 16. A space between trough 46 and tube bottom wall 44b will receive the return flight 14b of lower belt 14.

Figure 5:
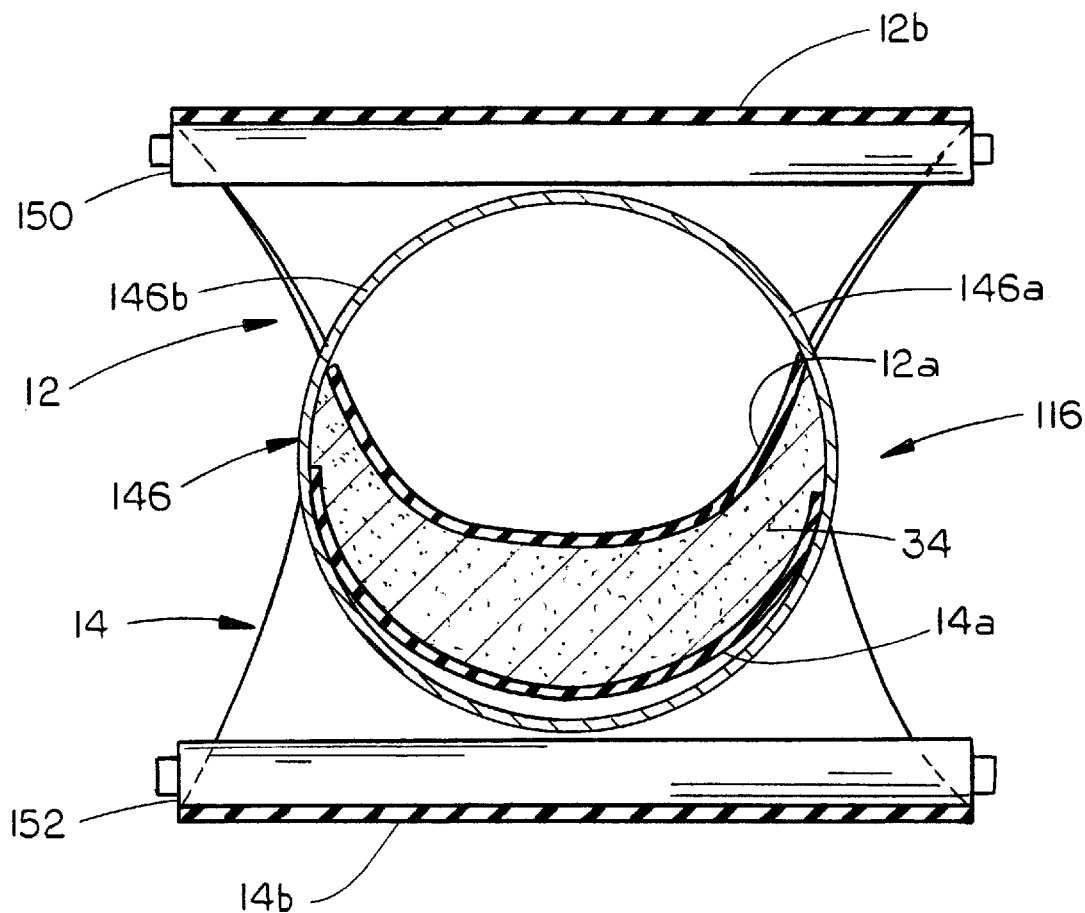
FIG. 5 is an enlarged sectional view similar to FIG. 4, but showing a second embodiment of the conveyor system.

Referring now to FIG. 5, a second embodiment of the conveyor hopper is designated generally 116. In this second embodiment, a cylindrical tube 146 serves as both the trough 46 and tube 44 used in the first embodiment shown in FIG. 4. The return flights 12b and 14b of belts 12 and 14 are then returned exteriorly of the tubular trough 146, after looping around upper and lower rollers 150 and 152 respectively.

Belts 12 and 14 have a width which is greater than the diameter of tubular trough 146, such that upper portions 146a and 146b (located above a horizontal diameter of tubular trough 146) serve the same inwardly sloping function as trough upper leg portions 46a and 46b of the first embodiment, shown in FIG. 4. Because the width of belts 12 and 14 is greater than the diameter of trough 146, the conveying flights 12a and 14a of belts 12 and 14, within trough 146, will be forced into a curved shaped by hopper sloped portions 146a and 146b. As with the first embodiment, this curved shape forces upper belt lower flight 12a downward into contact with product 34 and against lower belt upper flight 14a, to retain product 34 securely therebetween as it is conveyed upwardly at a steep incline through conveyor hopper 116.

Whereas the invention has been shown and described in connection with the preferred embodiment thereof, many modifications, substitutions and additions may be made which are within the intended broad scope of the appended claims.

We claim:

1. A dual belt conveyor, comprising:
   a lower, flexible endless loop belt arranged at an incline and having an upper flight, a lower return flight, and opposing edges;
   an upper, flexible, endless loop belt with a lower flight, an upper return flight, and opposing edges, arranged with a portion of the lower flight in face-to-face conveying relationship with a portion of the lower belt upper flight from a lower end to an upper end of the face-to-face conveying portion of the belts;
   drive means for moving the belts at the same speed; and
   trough means supporting the lower belt upper flight in an orientation curved concavely from edge to edge from proximal the lower end to proximal the upper end;
   said trough means engaging the upper belt lower flight edges to cause the upper belt lower flight to curve from edge to edge generally parallel to the lower belt upper flight; and
   said trough means engaging the upper belt lower flight to bias the upper belt lower flight against the lower belt upper flight, to retain granular product therebetween through the length of the face-to-face conveying portion of the belts.

2. A dual belt conveyor, comprising:
- a lower, flexible endless loop belt arranged at an incline and having an upper flight, a lower return flight, and opposing edges;
- an upper, flexible, endless loop belt with a lower flight, an upper return flight, and opposing edges, arranged with a portion of the lower flight in face-to-face conveying relationship with a portion of the lower belt upper flight from a lower end to an upper end of the face-to-face conveying portion of the belts;
- drive means for moving the belts at the same speed; and
- trough means supporting the lower belt upper flight in an orientation curved concavely from edge to edge from proximal the lower end to proximal the upper end;
- said trough means engaging the upper belt lower flight edges to cause the upper belt lower flight to curve from edge to edge generally parallel to and biased against the lower belt upper flight, to retain granular product therebetween through the length of the face-to-face conveying portion of the belts;
- said trough means including an elongated, generally U-shaped trough having a base portion connecting lower ends of generally upright legs, said base portion supporting the lower belt upper flight, and upper portions of the legs engaging the upper belt lower flight edges to bias the same downwardly against the lower belt upper flights.

3. The conveyor of claim 2, wherein the upper and lower belts have the same width between side edges, and wherein the width of the belt is greater than a width of the trough between the legs.

4. The conveyor of claim 3, wherein the trough leg upper portions are inclined towards one another.

5. The conveyor of claim 4, wherein the trough legs include lower portions inclined away from one another, to support portions of the lower belt upper flight.

6. The conveyor of claim 5, wherein said trough is supported within an elongated hopper having a lower input end and upper discharge end.

7. The conveyor of claim 6, wherein said lower belt includes a lower end projecting rearwardly from the lower end of the hopper and beyond a rearward end of the upper belt, to form an infeed conveyor.

8. The conveyor of claim 2, wherein said U-shaped trough is a portion of a cylindrical tube, with the base portion forming a lower portion of the tube, and the leg portions extending upwardly from the base portion and forming side portions and upper portions of the tube.

9. The conveyor of claim 8, wherein the upper and lower belts have the same width between side edges, and wherein the width of the belts is greater than the diameter of the tube.

10. The conveyor of claim 9, wherein the width of the belts is greater then on-half the circumference of the tube but less than the circumference of the tube.

11. The conveyor of claim 1, wherein said trough means includes an elongated cylindrical tube having a predetermined diameter and circumference, wherein the width of the belts as measured between their opposing side edges, is greater than the diameter of the tube, and wherein the upper belt lower flight and lower belt upper flight extend through said tube.

12. The conveyor of claim 11, wherein the width of the belts is greater than one-half the circumference of the tube.

13. A dual belt conveyor, comprising:
- a lower, flexible endless loop belt arranged at an incline and having an upper flight, a lower return flight, and opposing edges;
- an upper, flexible, endless loop belt with a lower flight, an upper return flight, and opposing edges, arranged with a portion of the lower flight in face-to-face conveying relationship with a portion of the lower belt upper flight from a lower end to an upper end of the face-to-face conveying portion of the belts;
- drive means for moving the belts at the same speed; and
- trough means supporting the lower belt upper flight in an orientation curved concavely from edge to edge from proximal the lower end to proximal the upper end;
- said trough means engaging the upper belt lower flight edges to cause the upper belt lower flight to curve from edge to edge generally parallel to and biased against the lower belt upper flight, to retain granular product therebetween through the length of the face-to-face conveying portion of the belts;
- wherein said trough means includes an elongated cylindrical tube having a predetermined diameter and circumference, and wherein the width of the belts as measured between their opposing side edges, is greater than the diameter of the tube;
- wherein the width of the belts is greater than one-half the circumference of the tube; and
- wherein the width of the belts is less than the circumference of the tube.

14. The conveyor of claim 13, wherein the upper and lower belts are equal in width.

* * * * *